(12) United States Patent
Chen

(10) Patent No.: US 6,671,927 B2
(45) Date of Patent: Jan. 6, 2004

(54) ROTATING MECHANISM FOR LCD MONITOR

(75) Inventor: Chi-Mi Chen, Taipei (TW)

(73) Assignee: Lite-On Technology Corp., Taipei (TW)

( * ) Notice: Subject to any disclaimer, the term of this patent is extended or adjusted under 35 U.S.C. 154(b) by 0 days.

(21) Appl. No.: 10/175,321

(22) Filed: Jun. 19, 2002

(65) Prior Publication Data

US 2003/0121124 A1 Jul. 3, 2003

(30) Foreign Application Priority Data

Dec. 21, 2001 (TW) ...................................... 90222566 U

(51) Int. Cl.$^7$ ............................................. E05D 11/08
(52) U.S. Cl. ............................. 16/339; 16/337; 16/340
(58) Field of Search .......................... 16/337–340, 342; 361/680–683; 248/917–923; 403/351, 365, 371, 114, 120

(56) References Cited

U.S. PATENT DOCUMENTS

| | | | | |
|---|---|---|---|---|
| 1,847,937 A | * | 3/1932 | Petters | 16/339 |
| 1,956,040 A | * | 4/1934 | Meyer | 16/340 |
| 2,926,380 A | * | 3/1960 | Richard | 16/338 |
| 3,837,042 A | * | 9/1974 | White | 16/339 |
| 4,428,094 A | * | 1/1984 | Emain | 16/228 |
| 4,478,532 A | * | 10/1984 | Puro | 403/157 |
| 5,333,356 A | * | 8/1994 | Katagiri | 16/340 |
| 5,388,308 A | * | 2/1995 | Meeuwissen | 16/340 |
| 5,774,939 A | * | 7/1998 | Lu | 16/342 |
| 6,018,847 A | * | 2/2000 | Lu | 16/337 |
| 6,101,676 A | * | 8/2000 | Wahl et al. | 16/342 |
| 6,381,808 B1 | * | 5/2002 | Kida | 16/340 |

FOREIGN PATENT DOCUMENTS

JP   2002-106542 A   *   4/2002

OTHER PUBLICATIONS

Patent application Publication U. S. 2002/0174519 A1, Nov. 2002.*

* cited by examiner

Primary Examiner—Chuck Y. Mah
(74) Attorney, Agent, or Firm—Thomas, Kayden, Horstemeyer & Risley

(57) ABSTRACT

A rotating mechanism for an LCD monitor having a monitor and a supporting structure. The rotating mechanism comprises a protruding sleeve, a supporting body, a shaft sleeve, a sleeve, a first screwing element and a second screwing element. The protruding sleeve has a fitting hole and is disposed on the back of the monitor. The supporting body has a bending element. The shaft sleeve is fitted between the protruding sleeve and the bending element of the supporting body. The sleeve is fitted in the fitting hole of the protruding sleeve. The first screwing element is threaded into one end of the shaft sleeve from the sleeve. The second screwing element is threaded into the other end of the shaft sleeve from the bending element. Thus, the tightness of the rotating mechanism of the invention can be adjusted by way of the first screwing element.

9 Claims, 7 Drawing Sheets

ROTATING MECHANISM FOR LCD MONITOR

BACKGROUND OF THE INVENTION

1. Field of the Invention

The present invention relates to a rotating mechanism, and in particular to a rotating mechanism for an LCD monitor.

2. Description of the Related Art

FIG. 1 shows the partially exploded rear view of a conventional LCD monitor, wherein the back cover 201 and the right back cover 202 are disassembled. The conventional LCD monitor includes a monitor 1 and a supporting portion (not shown) connected to the monitor 1 and placed on a desk.

As shown in FIG. 1, a rotating shaft 2 is disposed between the back of the monitor 1 and the supporting portion for adjusting the inclined angle of the monitor 1. The rotating shaft 2 includes a shaft body 21, two symmetric protruding elements 22 and two symmetric twisting springs 23. The shaft body 21 is fixed to a stand 24 such that the monitor 1 can rotate around the shaft body 21.

Two ends of the shaft body 21 of the conventional rotating shaft 2 are riveted to the corresponding protruding elements 22. Thus, the tightness of the rotating shaft 2 is fixed and cannot be adjusted. If the rotating shaft 2 is too tightly riveted to the protruding elements 22, it is very difficult to adjust the inclined angle of the monitor 1. On the other hand, if the rotating shaft 2 is too loosely riveted to the protruding elements 22, the supporting portion moves easily and the inclined angle of the monitor 1 is unstable. Further, the manufacturing cost of the conventional rotating shaft 2 is high and the assembly is complicated.

SUMMARY OF THE INVENTION

An object of the invention is to provide an improved rotating mechanism for an LCD monitor having a monitor (1) and a supporting structure (9). The rotating mechanism comprises a protruding sleeve (3) having a fitting hole (31) and disposed on the back of the monitor (1); a supporting body (7) having a bending element (71); a shaft sleeve (6) fitted between the protruding sleeve (3) and the bending element (71) of the supporting body (7); a sleeve (4) fitted in the fitting hole (31) of the protruding sleeve (3); a first screwing element (5) threaded into one end of the shaft sleeve (6) from the sleeve (4); and a second screwing element (8) threaded into the other end of the shaft sleeve (6) from the bending element (71). The protruding sleeve (3) is held between the sleeve (4) and the shaft sleeve (6) and the shaft sleeve (6), the supporting structure (9) and the bending element (71) cannot rotate.

Thus, the tightness of the rotating mechanism of the invention can be adjusted by way of the first screwing element (5). In addition, the manufacturing cost of the rotating mechanism of the invention is reduced. The inclined angle of the monitor (1) can be limited within a certain range. The assembly of the rotating mechanism is easier and simplified.

A detailed description will be given by the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

First Embodiment

Figure 1:
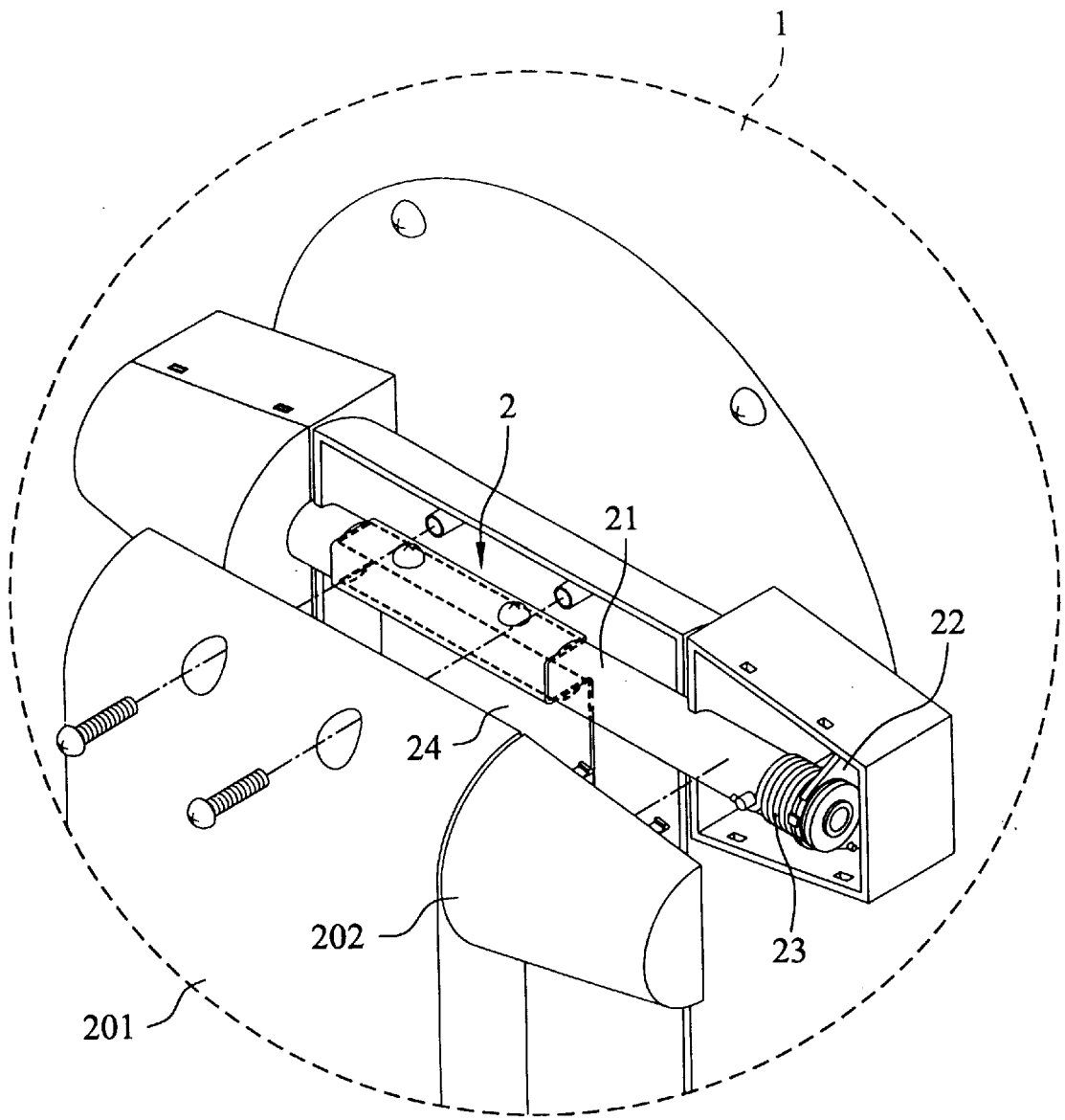
FIG. 1 shows the partially exploded rear view of a conventional LCD monitor.
Figure 2A:
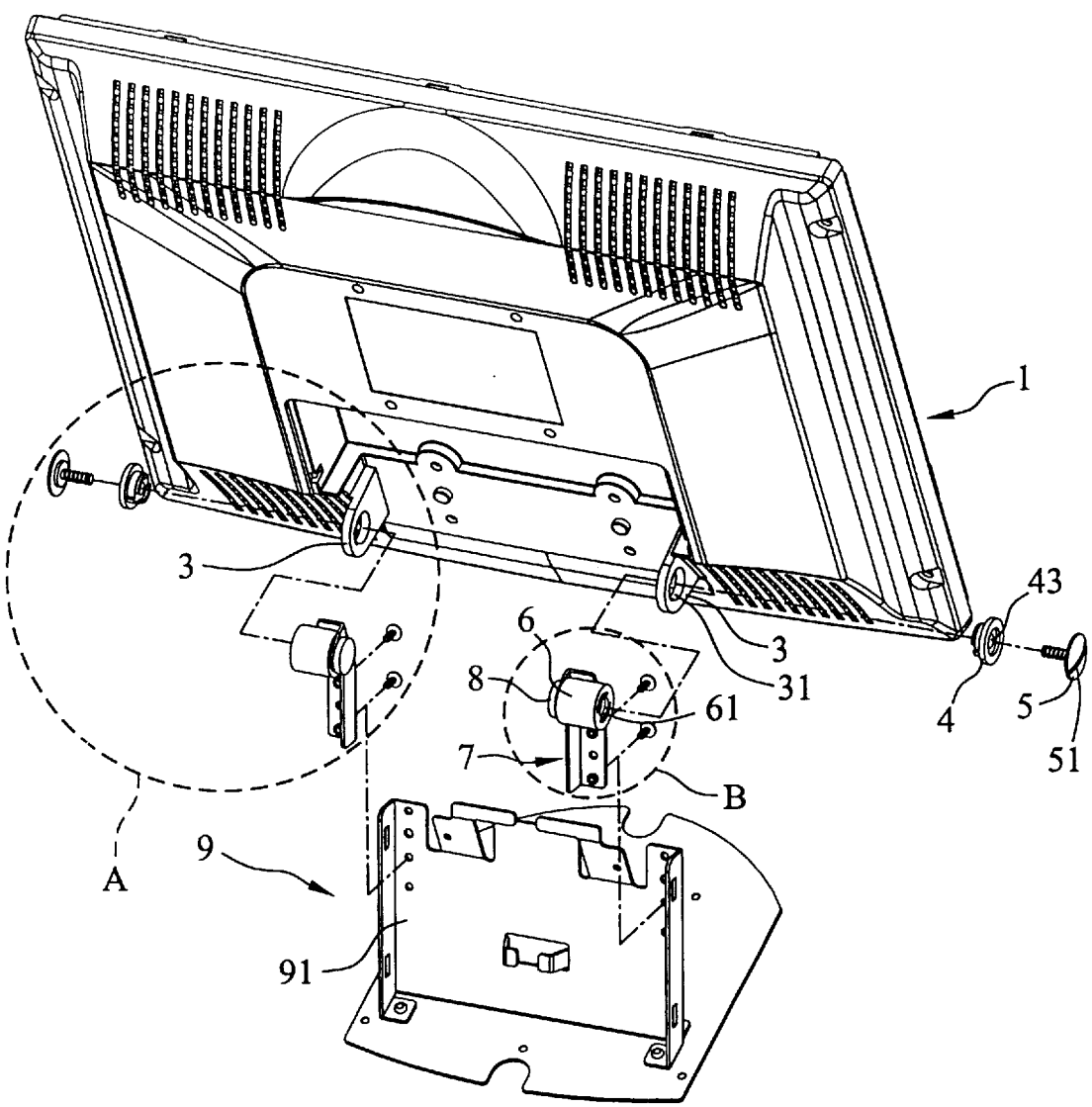
FIG. 2A is an exploded perspective view of the invention.
Figure 3:
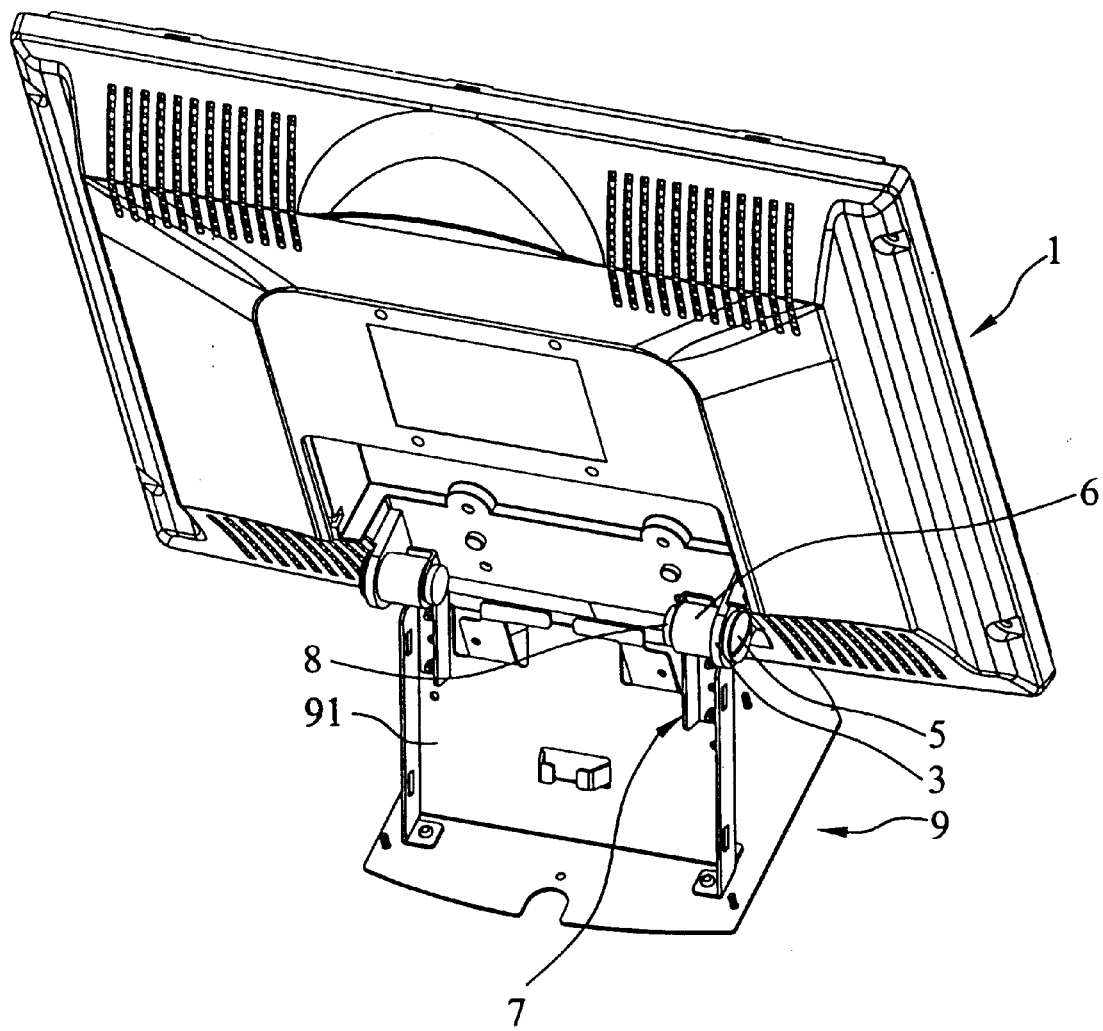
FIG. 3 is a perspective assembly view of the invention.

Referring to FIG. 2A and FIG. 3, the LCD monitor comprises a monitor 1 and a supporting structure 9. A rotating mechanism disposed between the monitor 1 and the supporting structure 9 comprises a first screwing element 5, a sleeve 4, a shaft sleeve 6 and a second screwing element 8.

Figure 2B:
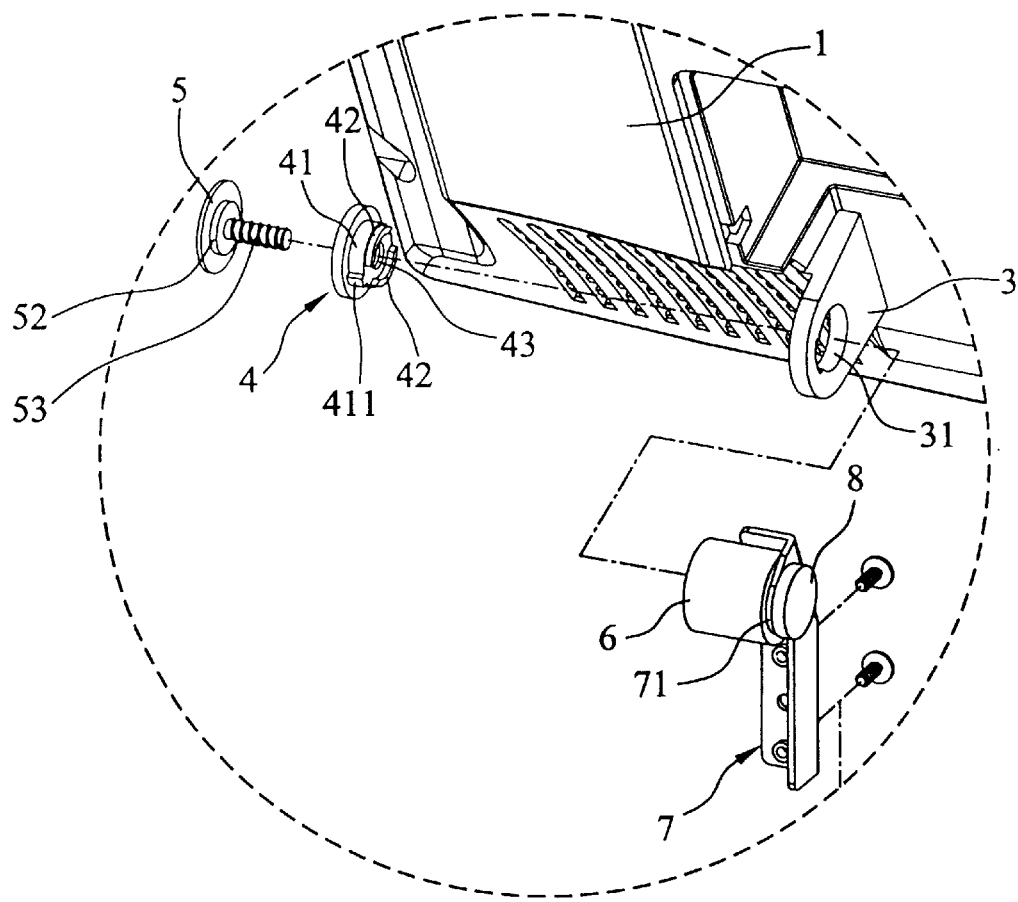
FIG. 2B shows a partially enlarged view (A) of the FIG. 2A.

Two protruding sleeves 3 are disposed on the back of the monitor 1. A stand 91 is upwardly disposed in the supporting structure 9. Two supporting bodies 7 are symmetrically disposed on opposite sides of the stand 91. As shown in FIG. 2B, two bending elements 71 are symmetrically disposed on the two supporting bodies 7, respectively. The rotating mechanism is fitted in the two symmetric protruding sleeves 3 and the two symmetric bending elements 71.

Figure 5:
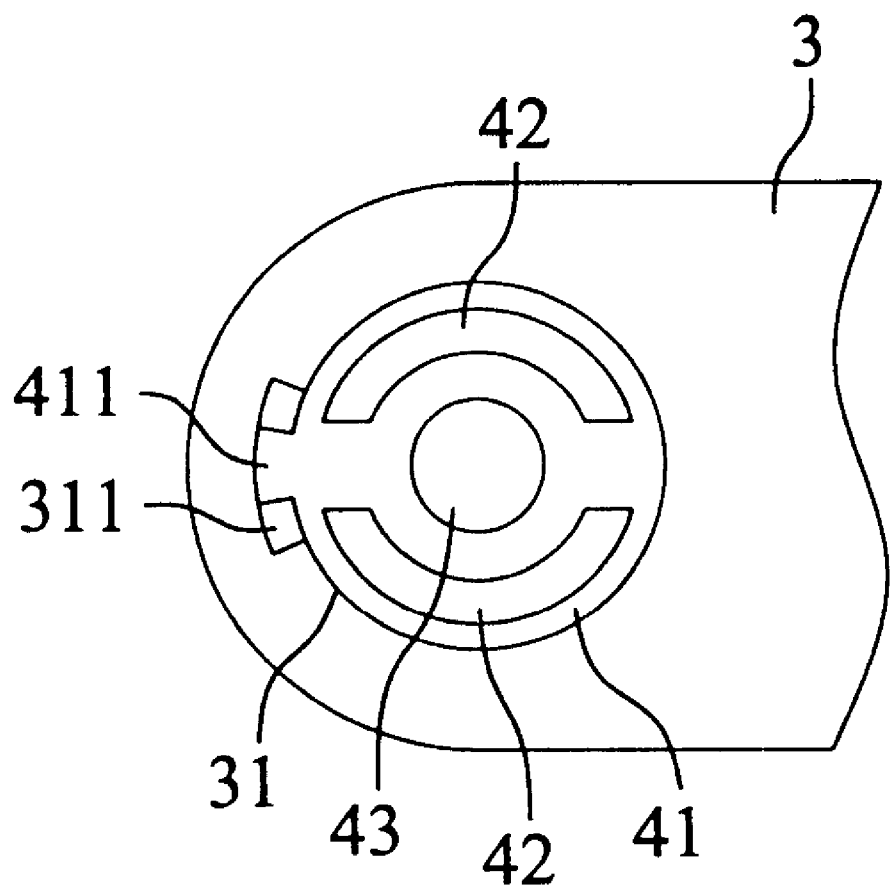
FIG. 5 is a right side view showing the sleeve (4) fitted in the protruding sleeve (3).

Referring to FIG. 5, the protruding sleeve 3 has a fitting hole 31. An indentation 311 is formed in the inner edge of the fitting hole 31.

Figure 4A:
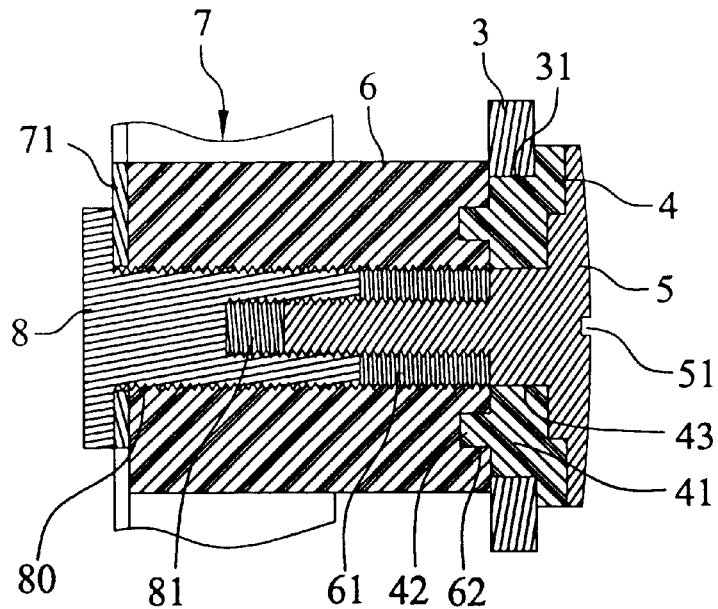
FIG. 4A shows a cross-section of the first embodiment of the present assembled rotating mechanism.

Referring to FIG. 2A and FIG. 4A, a groove 51 is formed on the nut of the first screwing element 5 and used to screw the first screwing element 5 with a screwdriver. As shown in FIG. 2B, the first screwing element 5 has a circular flange 52 and a thread shaft 53 axially extending from the circular flange 52.

Figure 2C:
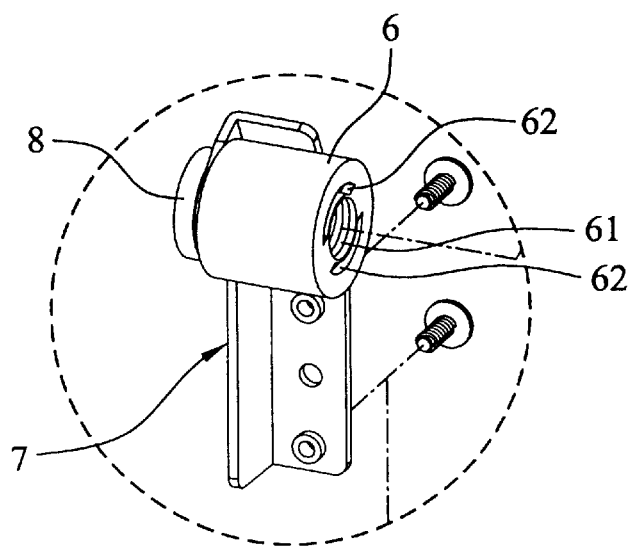
FIG. 2C shows a partially enlarged view (B) of the FIG. 2A.
Figure 4B:
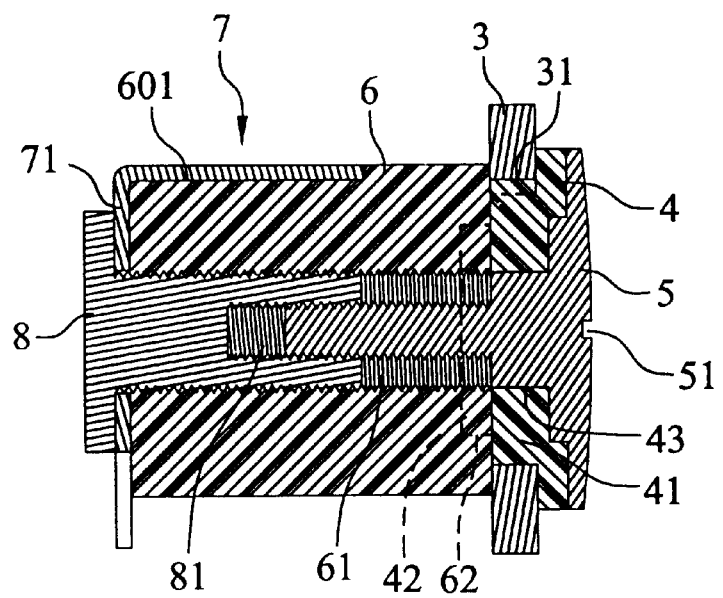
FIG. 4B shows another cross-section of the first embodiment of the present assembled rotating mechanism.

Referring to FIG. 2B and FIG. 5, the sleeve 4 has a protruding ring portion 41 for fitting in the fitting hole 31 of the protruding sleeve 3. A protrusion 411 is radially formed on the protruding ring portion 41. The sleeve 4 also includes a through hole 43. Two positioning ribs 42 are symmetrically formed in the protruding ring portion 41 and outside the through hole 43. As shown in FIG. 2C, a first thread hole 61 is axially formed in the shaft sleeve 6. Two positioning grooves 62 surrounding the first thread hole 61 are symmetrically formed on one end of the shaft sleeve 6. As shown in FIG. 4B, a positioning portion 601 is disposed outside the shaft sleeve 6 and adjacent to the supporting body 7. The positioning portion 601 is a concave surface formed on the supporting body 7. Thus, the shaft sleeve 6 cannot rotate because the positioning portion 601 is formed on the fixed supporting body 7. As shown in FIG. 4A, a second thread hole 81 is formed in one end of the thread shaft 80 of the second screwing element 8.

Referring to FIG. 4A and FIG. 5, the second screwing element 8 is threaded to the shaft sleeve 6 by way of one end of the shaft sleeve 6. Thus, the bending element 71 is held between the second screwing element 8 and the shaft sleeve 6. The other end of the shaft sleeve 6 is adjacent to the protruding sleeves 3. The sleeve 4 is fitted to the fitting hole 31 by way of the protruding ring portion 41 and the positioning ribs 42 are engaged with the corresponding positioning grooves 62. The protrusion 411 is located in the indentation 311. As shown in FIG. 4B, the positioning portion 601 is completely attached to the supporting body 7. The first screwing element 5 is fitted to the sleeve 4 via the through hole 43. The first screwing element 5 is threaded into the first thread hole 61 of the shaft sleeve 6. The first screwing element 5 is threaded into the second thread hole 81 of the second screwing element 8. The positioning portion 601 of the shaft sleeve 6 is formed on the fixed supporting body 7. Thus, the shaft sleeve 6 cannot rotate.

The monitor 1 and the protruding sleeves 3 disposed on the back of the monitor 1 are rotatable while the other elements, in particular the first screwing element 5, the sleeve 4, the shaft sleeve 6, the second screwing element 8, the supporting structure 9, the stand 91 and the supporting body 7, are not rotatable.

By threading the first screwing element 5 into the second screwing element 8, the protruding sleeve 3 can be tightly held by the sleeve 4 and the shaft sleeve 6. On the other hand, by threading the first screwing element 5 out of the second screwing element 8, the protruding sleeves 3 can be loosely held by the sleeve 4 and the shaft sleeve 6. Thus, the tightness of the rotating mechanism of the invention can be easily adjusted. In addition, a screwdriver can be applied to the groove 51 to thread the first screwing element 5 and adjust the tightness of the rotating mechanism.

Referring to FIG. 4A, FIG. 4B and FIG. 5, in the aspect of adjusting the inclined angle of the monitor 1, the shaft sleeve 6 cannot rotate since the positioning portion 601 of the shaft sleeve 6 is formed on the fixed supporting body 7. Because the positioning ribs 42 of the sleeve 4 are fitted in the positioning grooves 62 of the sleeve 6, the sleeve 4 cannot rotate due to the fixed shaft sleeve 6. As shown in FIG. 5, because the protrusion 411 is constrained within the indentation 311, the rotating angle of the protruding sleeve 3 is limited when the monitor 1 accompanied by the protruding sleeve 3 rotates. Thus, the rotating angle of the protruding sleeve 3 depends on the size of the indentation 311.

Second Embodiment

Figure 4C:
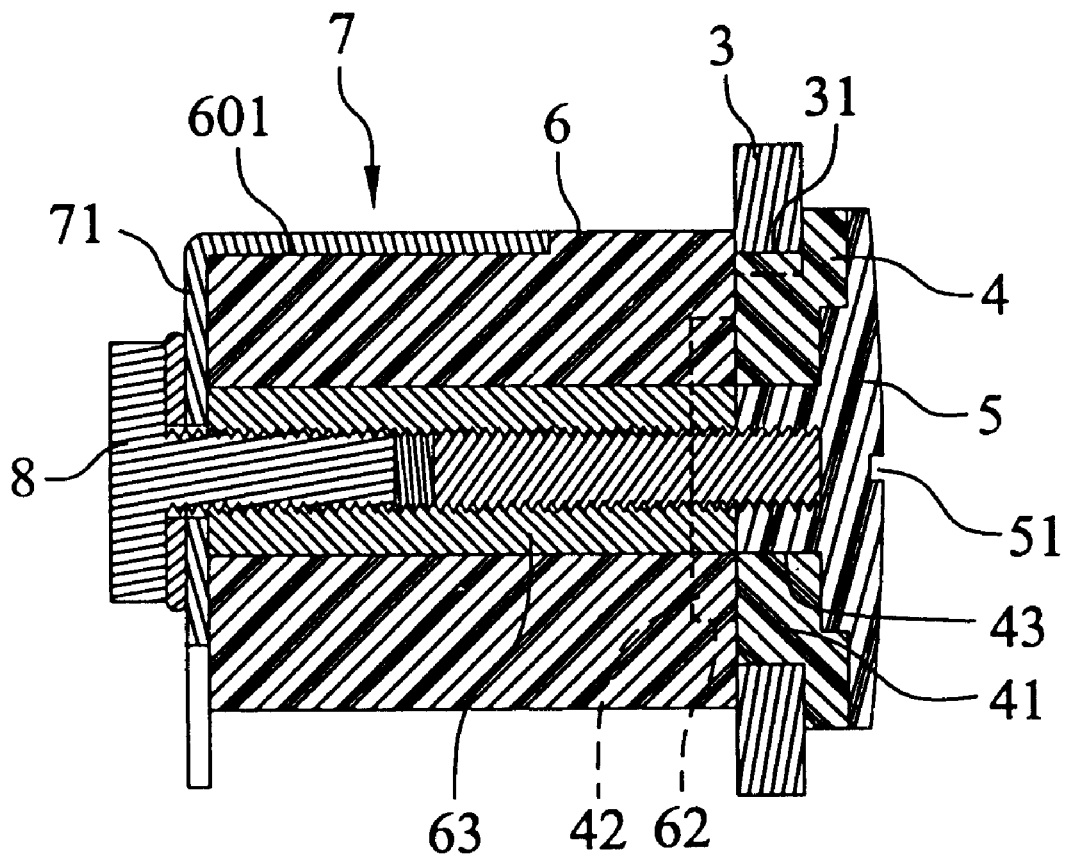
FIG. 4C shows a cross-section of the second embodiment of the present assembled rotating mechanism.

Referring to FIG. 4C, a thread shaft 63 with inner threads is disposed inside the shaft sleeve 6. The second screwing element 8 is threaded to the left end of the thread shaft 63 by threading into the shaft sleeve 6 from the left end of the bending element 71. The first screwing element 5 is threaded to the right end of the thread shaft 63 by threading into the shaft sleeve 6 from the right end of the sleeve 4. The arrangement of the other elements of this embodiment is the same as that of the first embodiment. Thus, the tightness of the rotating mechanism and the inclined angle of the monitor 1 can be adjusted.

As mentioned above, the tightness of the rotating mechanism of the first embodiment and the second embodiment can be adjusted by the first screwing element 5. In addition, the manufacturing cost of the rotating mechanism of the invention is reduced. The inclined angle of the monitor 1 can be limited within a certain range. The assembly of the rotating mechanism is easier and simplified.

While the invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A rotating mechanism for an LCD monitor having a monitor and a supporting structure, comprising:

a protruding sleeve having a fitting hole and disposed on the back of the monitor;

a supporting body having a bending element;

a shaft sleeve fitted between the protruding sleeve and the bending element of the supporting body;

a sleeve fitted in the fitting hole of the protruding sleeve;

a first screwing element threaded into one end of the shaft sleeve from the sleeve; and a second screwing element threaded into the other end of the shaft sleeve from the bending element, whereby, the protruding sleeve is held between the sleeve and the shaft sleeve.

2. The rotating mechanism as claimed in claim 1, wherein the shaft sleeve further comprises a first thread hole and the second screwing element further comprises a second thread hole, the second screwing element threaded into the first thread hole of the shaft sleeve from the bending element, the first screwing element threaded into the first thread hole of the shaft sleeve and the second thread hole of the second screwing element from the sleeve.

3. The rotating mechanism as claimed in claim 1, wherein a thread shaft with inner threads is disposed inside the shaft sleeve, the second screwing element threaded into one end of the thread shaft from the bending element, the first screwing element threaded into the other end of the thread shaft from the sleeve.

4. The rotating mechanism as claimed in claim 1, wherein the shaft sleeve further comprises a positioning portion for preventing the shaft sleeve from rotating, the positioning portion being adjacent to the supporting structure and on the outer surface of the shaft sleeve.

5. The rotating mechanism as claimed in claim 4, wherein the positioning portion of the shaft sleeve is a concave surface.

6. The rotating mechanism as claimed in claim 1, wherein the fining hole of the protruding sleeve further comprises an indentation and the sleeve further comprises a protrusion, the protrusion located in the indentation for limiting the range of the inclined angle of the monitor.

7. The rotating mechanism as claimed in claim 6, wherein the shaft sleeve further comprises two positioning grooves symmetrically formed on one end of the shaft sleeve and the sleeve further comprises two positioning ribs corresponding to the two positioning grooves, the two positioning ribs fined in the two positioning grooves, respectively.

8. The rotating mechanism as claimed in claim 1, wherein the first screwing element further comprises a groove formed on the outer end of the first screwing element for threading the first screwing element by a screwdriver.

9. The rotating mechanism as claimed in claim 1, wherein the sleeve further comprises a protruding ring portion and a through hole, the protruding ring portion fitted in the fitting hole of the protruding sleeve, the through hole penetrated by the first screwing element.

\* \* \* \* \*